(12) United States Patent
Milne et al.

(10) Patent No.: US 11,451,907 B2
(45) Date of Patent: Sep. 20, 2022

(54) TECHNIQUES COMBINING PLURAL HEAD-RELATED TRANSFER FUNCTION (HRTF) SPHERES TO PLACE AUDIO OBJECTS

(71) Applicant: Sony Corporation, Tokyo (JP)

(72) Inventors: James R. Milne, Ramona, CA (US); Gregory Peter Carlsson, Santee, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/424,983

(22) Filed: May 29, 2019

(65) Prior Publication Data

US 2020/0382871 A1    Dec. 3, 2020

(51) Int. Cl.
*H04R 5/04*    (2006.01)
*H04R 5/027*    (2006.01)
(Continued)

(52) U.S. Cl.
CPC .............. *H04R 5/04* (2013.01); *H04R 5/027* (2013.01); *H04R 5/033* (2013.01); *H04R 29/002* (2013.01); *H04S 7/301* (2013.01); *H04S 7/304* (2013.01); *G02B 27/017* (2013.01); *G06F 3/012* (2013.01); *H04N 21/25816* (2013.01); *H04N 21/6547* (2013.01); *H04S 2420/01* (2013.01)

(58) Field of Classification Search
CPC .......... H04R 5/04; H04R 5/027; H04R 5/033; H04R 29/002; H04S 7/301; H04S 7/304; H04S 2420/01; G06F 3/012; H04N 21/25816; H04N 21/6547; G02B 27/017
See application file for complete search history.

(56) References Cited

U.S. PATENT DOCUMENTS 6,181,800 B1    1/2001    Lambrecht
6,795,556 B1    9/2004    Sibbald et al.
(Continued)

FOREIGN PATENT DOCUMENTS

CN    105027580 B    5/2017
CN    107172566 B    1/2019
(Continued)

OTHER PUBLICATIONS

Farina et al, Measuring Spatial MIMO impulse responses in rooms employing spherical transducer array, AES (Year: 2016).*

(Continued)

*Primary Examiner* — Matthew A Eason
*Assistant Examiner* — Kuassi A Ganmavo
(74) *Attorney, Agent, or Firm* — John L. Rogitz (57) ABSTRACT

Concentric rings of speakers in a room are activated in sequence to emit test sounds that are picked up by microphones placed in the ears of a listener in the middle of the room. The output of the microphones is used to generate plural HRTF spheres that are concentric, and that can be convolved with each other to render a multi-distance HRTF filter that can be configured to "move" the perceived distance and bearing of audio objects "inside" the outer sphere as desired, without being restricted to placing the audio objects at the outer edges of a single sphere. Any desired placement of an audio object between spheres is done by interpolating between respective coefficients of the closest spheres.

15 Claims, 9 Drawing Sheets

(51) Int. Cl.

| | | |
|---|---|---|
| H04R 5/033 | (2006.01) | |
| H04S 7/00 | (2006.01) | |
| H04R 29/00 | (2006.01) | |
| H04N 21/6547 | (2011.01) | |
| G02B 27/01 | (2006.01) | |
| G06F 3/01 | (2006.01) | |
| H04N 21/258 | (2011.01) | |

(56) References Cited

U.S. PATENT DOCUMENTS

| | | | |
|---|---|---|---|
| 7,634,092 B2 | 12/2009 | McGrath | |
| 7,720,229 B2 | 5/2010 | Duraiswami et al. | |
| 7,840,019 B2 | 11/2010 | Slaney et al. | |
| 8,452,036 B2 | 5/2013 | Sommer et al. | |
| 8,489,371 B2 | 7/2013 | Guillon et al. | |
| 8,503,682 B2 | 8/2013 | Fukui et al. | |
| 8,520,857 B2 | 8/2013 | Fukui et al. | |
| 8,787,584 B2 | 7/2014 | Nyström et al. | |
| 9,030,545 B2 | 5/2015 | Pedersen | |
| 9,101,279 B2 | 8/2015 | Ritchey et al. | |
| 9,118,488 B2 | 8/2015 | Donaldson | |
| 9,118,991 B2 | 8/2015 | Nystrom et al. | |
| 9,167,368 B2 | 10/2015 | Jong et al. | |
| 9,448,405 B2 | 9/2016 | Yamamoto | |
| 9,544,706 B1 | 1/2017 | Hirst | |
| 9,591,427 B1* | 3/2017 | Lyren | G06K 9/00228 |
| 9,740,305 B2 | 8/2017 | Kabasawa et al. | |
| 9,848,273 B1 | 12/2017 | Helwani et al. | |
| 9,854,362 B1 | 12/2017 | Milne et al. | |
| 9,900,722 B2 | 2/2018 | Bilinski et al. | |
| 9,924,289 B2 | 3/2018 | Trivi et al. | |
| 9,992,602 B1 | 6/2018 | Allen | |
| 10,003,905 B1 | 6/2018 | Milne et al. | |
| 10,149,089 B1 | 12/2018 | Edry et al. | |
| 10,154,365 B2 | 12/2018 | Silva | |
| 10,206,055 B1 | 2/2019 | Mindlin et al. | |
| 10,455,327 B2 | 10/2019 | Oswald et al. | |
| 10,492,018 B1* | 11/2019 | Allen | H04S 3/008 |
| 10,499,179 B1 | 12/2019 | Lyren | |
| 2004/0091119 A1* | 5/2004 | Duraiswami | H04S 1/002 |
| | | | 381/26 |
| 2006/0116930 A1 | 6/2006 | Goldstein | |
| 2006/0282671 A1 | 12/2006 | Burton | |
| 2011/0137437 A1 | 6/2011 | Jonsson | |
| 2011/0314530 A1 | 12/2011 | Donaldson | |
| 2012/0014528 A1 | 1/2012 | Wang | |
| 2012/0201405 A1 | 8/2012 | Slamka et al. | |
| 2012/0213375 A1 | 8/2012 | Mahabub et al. | |
| 2013/0036452 A1 | 2/2013 | Yamashita | |
| 2013/0154930 A1 | 6/2013 | Xiang et al. | |
| 2013/0169779 A1 | 7/2013 | Pedersen | |
| 2013/0170679 A1* | 7/2013 | Nystrom | H04R 5/033 |
| | | | 381/311 |
| 2013/0177166 A1 | 7/2013 | Agevik et al. | |
| 2013/0208899 A1 | 8/2013 | Vincent et al. | |
| 2014/0171195 A1 | 6/2014 | Searchfield et al. | |
| 2014/0185847 A1* | 7/2014 | Gran | H04R 25/407 |
| | | | 381/313 |
| 2015/0010160 A1* | 1/2015 | Udesen | H04R 25/70 |
| | | | 381/60 |
| 2015/0063610 A1 | 3/2015 | Mossner | |
| 2015/0106475 A1 | 4/2015 | Tan et al. | |
| 2015/0256613 A1 | 9/2015 | Walker et al. | |
| 2015/0293655 A1 | 10/2015 | Tan | |
| 2015/0347735 A1 | 12/2015 | Yamashita | |
| 2016/0080577 A1* | 3/2016 | Norris | H04R 5/033 |
| | | | 455/412.1 |
| 2016/0100268 A1 | 4/2016 | Stein et al. | |
| 2016/0124707 A1 | 5/2016 | Ermilov et al. | |
| 2016/0142848 A1 | 5/2016 | Saltwell | |
| 2016/0269849 A1* | 9/2016 | Riggs | H04S 7/301 |
| 2017/0078820 A1 | 3/2017 | Brandenburg et al. | |
| 2017/0094440 A1 | 3/2017 | Brown et al. | |
| 2017/0332186 A1* | 11/2017 | Riggs | H04S 7/301 |
| 2018/0091921 A1 | 3/2018 | Silva | |
| 2018/0136898 A1 | 5/2018 | Shi et al. | |
| 2018/0139565 A1* | 5/2018 | Norris | H04S 7/304 |
| 2018/0249276 A1 | 8/2018 | Godfrey | |
| 2018/0310115 A1 | 10/2018 | Romigh | |
| 2019/0007725 A1 | 1/2019 | Ferrer | |
| 2019/0200159 A1 | 6/2019 | Park et al. | |
| 2019/0215637 A1* | 7/2019 | Lee | G06K 9/6204 |
| 2020/0045491 A1 | 2/2020 | Robinson et al. | |
| 2020/0077222 A1 | 3/2020 | Nguyen et al. | |
| 2020/0104620 A1 | 4/2020 | Cohen et al. | |
| 2020/0107149 A1 | 4/2020 | Sunder et al. | |
| 2020/0260199 A1* | 8/2020 | Burwinkel | H04R 27/00 |
| 2021/0185471 A1 | 6/2021 | Jot et al. | |

FOREIGN PATENT DOCUMENTS

| | | |
|---|---|---|
| JP | 5285626 B2 | 9/2013 |
| JP | 2017092732 A | 5/2017 |
| KR | 20180051411 A * | 5/2018 |
| WO | 2017116308 A1 | 7/2017 |
| WO | 2018110269 A1 | 6/2018 |
| WO | 2019059558 A1 | 3/2019 |

OTHER PUBLICATIONS

Thesaurus, Deviation Synonyms Deviation Antonyms, (Year: 2011).*

Milne et al., "Generating Personalized End User Head-Related Transfer Function (HRTF) from Generic HRTF", file history of related U.S. Appl. No. 16/662,995, filed Oct. 24, 2019.

Milne et al., "Generating Personalized End User Room-Related Transfer Function (RRTF)", file history of related U.S. Appl. No. 16/681,632, filed Nov. 12, 2019.

Yarra 3DX: The Most Advanced 3D Audio System In The World, Jul. 2016, retrieved from https://www.kickstarter.com/projects/yarra3dx/yarra-3dx-the-most-advanced-3d-audio-system-in-the.

Politis et al., "Applications of 3D spherical transforms to personalization of head-related transfer functions", 2016 IEEE International Conference on Acoustics, Speech and Signal Processing (ICASSP), Mar. 2016.

"Hear an Entirely New Dimension of Sound", OSSIC, Retrieved from https://www.ossic.com/3d-audio/.

Dmitry N. Zotkin, Jane Hwang, Ramani Duraiswami, Larry S. Davis, "HRTF Personalization Using Anthropometric Measurements", Perceptual Interfaces and Reality Laboratory Institute for Advanced Computer Studies (UMIACS), University of Maryland (2003).

Henrik Moller, "Fundamentals of Binaural Technology", Acoustics Laboratory, Aalborg University, Mar. 3, 1992, Aalborg, Denmark.

James R. Milne, Gregory Carlsson, Tonni Sandager Larsen, "Global HRTF Repository", file history of related U.S. Appl. No. 16/424,313, filed May 28, 2019.

James R. Milne, Gregory Carlsson, Tonni Sandager Larsen, "Head Related Transfer Function (HRTF) as Biometric Authentication", file history of related U.S. Appl. No. 16/440,288, filed Jun. 13, 2019.

James R. Milne, Gregory Peter Carlsson, "Generating Personalized End User Head-Related Transfer Function (HRTF) Using Panoramic Images of Ear", file history of related U.S. Appl. No. 16/168,317, filed Oct. 23, 2018.

Slim Ghorbal, Renaud Seguier, Xavier Bonjour, "Process of HRTF Individualization by 3D Stastical Ear", Audio Engineering Society, Convention e-Brief 283, Presented at the 141st Convention, Sep. 29-Oct. 2, 2016, Los Angeles, CA.

Sridhar et al., "A Database of Head-Related Transfer Function and Morphological Measurements", Audio Engineering Society, Oct. 2017, New York.

Sylvia Sima, "HRTF Measurements and Filter Designs for a Headphone-Based 3D-Audio System", Faculty of Engineering and Computer Science, Department of Computer Science, University of Applied Sciences, Hamburg, Germany, Sep. 6, 2008.

Thibaut Carpentier. "Binaural synthesis with the Web Audio API". 1st Web Audio Conference (WAC), Jan. 2015, Paris, France. hal-01247528.

(56) References Cited

OTHER PUBLICATIONS

Mohapatra et al., "Generating Personalized End User Head-Related Transfer Function (HRTF) from Generic HRTF", related U.S. Appl. No. 16/662,995, Final Office Action dated Sep. 29, 2020.
Mohapatra et al., "Generating Personalized End User Head-Related Transfer Function (HRTF) from Generic HRTF", related U.S. Appl. No. 16/662,995, Applicant's response to Final Office Action filed Oct. 27, 2020.
James R. Milne, Gregory Carlsson, Tonni Sandager Larsen, "Global HRTF Repository", related U.S. Appl. No. 16/424,313, Non-Final Office Action dated Aug. 6, 2020.
James R. Milne, Gregory Carlsson, Tonni Sandager Larsen, "Global HRTF Repository", related U.S. Appl. No. 16/424,313, Applicant's response to Non-Final Office Action filed Sep. 17, 2020.
James R. Milne, Gregory Peter Carlsson, "Generating Personalized End User Head-Related Transfer Function (HRTF) Using Panoramic Images of Ear", related U.S. Appl. No. 16/168,317, Non-Final Office Action dated Aug. 4, 2020.
James R. Milne, Gregory Peter Carlsson, "Generating Personalized End User Head-Related Transfer Function (HRTF) Using Panoramic Images of Ear", related U.S. Appl. No. 16/168,317, Applicant's response to Non-Final Office Action dated Sep. 17, 2020.
Mohapatra et al., "Generating Personalized End User Head-Related Transfer Function (HRTF) from Generic HRTF", related U.S. Appl. No. 16/662,995, Non-Final Office Action dated Jul. 31, 2020.
Mohapatra et al., "Generating Personalized End User Head-Related Transfer Function (HRTF) from Generic HRTF", related U.S. Appl. No. 16/662,995, Applicant's response to Non-Final Office Action filed Sep. 15, 2020.
James R. Milne, Gregory Carlsson, Tonni Sandager Larsen, "Head Related Transfer Function (HRTF) as Biometric Authentication",related U.S. Appl. No. 16/440,288, Non-Final Office Action dated Mar. 17, 2021.
James R. Milne, Gregory Carlsson, Tonni Sandager Larsen, "Head Related Transfer Function (HRTF) as Biometric Authentication",related U.S. Appl. No. 16/440,288, Applicant's response to Non-Final Office Action filed May 5, 2021.
Sonada et al., "User Authentication Scheme Using Individual Auditory Pop-Out", New Directions in Intelligent Interactive Multimedia. Studies in Computational Intelligence, vol. 142. Berlin, Heidelberg, 2008.
James R. Milne, Gregory Carlsson, Tonni Sandager Larsen, "Global HRTF Repository", related U.S. Appl. No. 16/424,313, Final Office Action dated Dec. 17, 2020.
James R. Milne, Gregory Carlsson, Tonni Sandager Larsen, "Global HRTF Repository", related U.S. Appl. No. 16/424,313, Applicant's response to Final Office Action filed Dec. 28, 2020.
Milne et al., "Generating Personalized End User Room-Related Transfer Function (RRTF)", related U.S. Appl. No. 16/681,632, Non-Final Office Action dated Jan. 11, 2021.
Milne et al., "Generating Personalized End User Room-Related Transfer Function (RRTF)", related U.S. Appl. No. 16/681,632,Applicant's response to Non-Final Office Action filed Jan. 29, 2021.
Mohapatra et al., "Generating Personalized End User Head-Related Transfer Function (HRTF) from Generic HRTF", related U.S. Appl. No. 16/662,995, Non-Final Office Action dated Jan. 21, 2021.
Mohapatra et al., "Generating Personalized End User Head-Related Transfer Function (HRTF) from Generic HRTF", related U.S. Appl. No. 16/662,995, Applicant's response to Non-Final Office Action filed Feb. 1, 2021.
Zotkin et al., "Rendering Localized Spatial Audio in a Virtual Auditory Space", in IEEE Transactions on Multimedia, vol. 6, No. 4, pp. 553-564, Aug. 2004, doi: 10.1109/TMM.2004.827516 (Year: 2004).
James R. Milne, Gregory Carlsson, Tonni Sandager Larsen, "Head Related Transfer Function (HRTF) as Biometric Authentication",related U.S. Appl. No. 16/440,288, Final Office Action dated Sep. 16, 2021.
James R. Milne, Gregory Carlsson, Tonni Sandager Larsen, "Head Related Transfer Function (HRTF) as Biometric Authentication",related U.S. Appl. No. 16/440,288, Applicant's response to Final Office Action filed Oct. 21, 2021.
Mohapatra et al., "Generating Personalized End User Head-Related Transfer Function (HRTF) from Generic HRTF", related U.S. Appl. No. 16/662,995, Non-Final Office Action dated Apr. 29, 2020.
Mohapatra et al., "Generating Personalized End User Head-Related Transfer Function (HRTF) from Generic HRTF", related U.S. Appl. No. 16/662,995, Applicant's response to Non-Final Office Action filed May 5, 2020.

* cited by examiner

Top View

- Series of speakers surrounding the listener in a sphere (x, y, z)
- Series of speakers surrounding the listener in a smaller sphere (x, y, z)
- Series of speakers surrounding the listener in a smaller sphere (x, y, z)

FIG. 6

Top View

- Series of speakers surrounding the listener in a sphere (x, y, z)
- Series of speakers surrounding the listener in a smaller sphere (x, y, z)
- Series of speakers surrounding the listener in a smaller sphere (x, y, z)

FIG. 7

Top View

■ Series of speakers surrounding the listener in a sphere (x, y, z)

FIG. 8

Side View

■ Series of speakers surrounding the listener (above and below) in a sphere (x, y, z)

TECHNIQUES COMBINING PLURAL HEAD-RELATED TRANSFER FUNCTION (HRTF) SPHERES TO PLACE AUDIO OBJECTS

FIELD

The present application relates generally to techniques for combining plural end user head-related transfer function (HRTF) spheres to place audio objects at desired perceived distances in space from a listener.

BACKGROUND

Binaural or head-related transfer function (HRTF) calibration is used to produce personalized HRTFs, which essentially are digital filters through which audio data is passed to output an audio stream on speakers that is tailored to the geometry of the head of the end user. Such calibration may involve placing microphones in the ears of a listener in a middle of a room surrounded by a ring of speakers, which are activated, with the output of the microphones being used to produce a HRTF tailored for the head geometry of the listener.

SUMMARY

As understood herein, to calibrate HRTF, the coefficients of the taps for one or more filters such as, for example, finite impulse response (FIR) filters are established, tailored to the particular geometry of the head of an end user for whom the HRTF is intended. For playback of audio objects using the HRTF, software may be used to place and move audio objects in an emulated three-dimensional (3D) space that is mapped to the sphere defined by the ring of speakers during HRTF calibration. As understood herein however, the perceived distances from the listener that the audio objects can be emulated is limited to the outer edges of the sphere.

Accordingly, in a first aspect, a system includes at least one computer medium that is not a transitory signal and that includes instructions executable by at least one processor to access at least first and second sets of head related transfer functions (HRTF) associated with respective first and second distances from a location. The first distance is shorter than the second distance. The instructions are executable to identify a demanded distance of at least one audio object and select at least a first HRTF from the first set of HRTF based at least in part on the demanded distance being closer to the first distance than to the second distance. The instructions also are executable to process the audio object using the first HRTF to render the audio object.

In an example, the first set of HRTF is associated with a first sphere having a radius of the first distance and the second set of HRTF is associated with a second sphere having a radius of the second distance.

The system may include the processor. The system may include at least one network server containing the processor and the computer medium and configured to transmit the audio object to at least one playback device. The system may alternatively include at least one playback device containing the processor and the computer medium and configured to render the audio object.

In examples, the system may include a third set of HRTF associated with a third sphere having a radius equal to a third distance shorter than the first distance, and the instructions can be executable to, responsive to identifying the demanded distance being between the first and third distances, process the audio object using an interpolation of at least the first HRTF and at least one HRTF from the third set of HRTF.

In some implementations, the instructions may be executable to select at least the first HRTF from the first set of HRTF based at least in part on a demanded bearing of the audio object. In some implementations, the instructions may be executable to select at least left and right ear HRTF from the first set of HRTF.

In another aspect, a method includes establishing plural sets of head related transfer functions (HRTF) associated with respective plural radial distances from an origin, and providing the plural sets of HRTF to render audio objects associated with demanded distances using at least a first HRTF from a set of HRTFs on the basis that the first HRTF is associated with a radial distance closer to the demanded distance than radial distances associated with other sets of HRTF.

In an example, the establishing can include energizing speakers in a first set of speakers located at the first radial distance from at least one microphone and using signals from the microphone generated in response to energizing the speakers in the first set of speakers to establish a first of the sets of HRTF. In this example the method may include energizing speakers in a second set of speakers located at the second radial distance from the microphone and using signals from the microphone generated in response to energizing the speakers in the second set of speakers to establish a second of the sets of HRTF.

In another example, the establishing can include energizing speakers in a first set of speakers located at the first radial distance from at least one microphone, using signals from the microphone generated in response to energizing the speakers in the first set of speakers at the first radial distance to establish a first of the sets of HRTF, and moving the speakers in the first set of speakers to a second radial distance from the microphone. This example method may then include energizing the speakers in the first set of speakers located at the second radial distance from the microphone and using signals from the microphone generated in response to energizing the speakers at the second radial distance to establish a second of the sets of HRTF.

In yet another example, the establishing can include energizing at least one speaker at the origin, detecting sound emitted by the speaker using plural microphones in a first set of microphones located at the first radial distance from the at least one speaker, and using signals from the microphones in the first set of microphones to establish a first of the sets of HRTF. This example may include detecting sound emitted by the speaker using plural microphones in a second set of microphones located at the second radial distance from the at least one speaker and using signals from the microphones in the second set of microphones to establish a second of the sets of HRTF.

In still another example the establishing can include energizing at least one speaker at the origin, detecting sound emitted by the speaker using plural microphones in a first set of microphones located at the first radial distance from the at least one speaker, and using signals from the microphones in the first set of microphones located at the first radial distance to establish a first of the sets of HRTF. This example may then include moving the first set of microphones to the second radial distance, detecting sound emitted by the first set of microphones located at the second radial distance from the at least one speaker, and using signals from the first set of microphones located at the second radial distance to establish a second of the sets of HRTF.

When multiple rings or spheres of speakers are used, speakers in the first set of speakers may be radially aligned with respective speakers in the second set of speakers. In other implementations speakers in the first set of speakers are not radially aligned with respective speakers in the second set of speakers.

Speakers in the first set of speakers may be arranged in a ring. Speakers in the first set of speakers may be arranged in a sphere.

In another aspect, a system includes at least one computer storage that is not a transitory signal and that in turn includes instructions executable by at least one processor to determine first head related transfer functions (HRTF) associated with respective concentric rings or spheres located at respective radial distances from a location. The instructions are executable to determine a second HRTF associated with at least one headphone. Further, the instructions are executable to subtract the second HRTF from the first HRTF to render final HRTF associated with the respective radial distances for processing audio objects associated with demanded distances.

The details of the present application, both as to its structure and operation, can be best understood in reference to the accompanying drawings, in which like reference numerals refer to like parts, and in which:

DETAILED DESCRIPTION

In overview, HRTF calibration is rendered more robust from the standpoint of locating audio objects in emulated space by, in one embodiment, creating a HRTF calibration file using a pair of headphones that have special-purpose built-in microphones. The calibration file may store FIR coefficients. Some of the microphones can be located inside the headphones, some inside the ears, and some outside the headphones. The headphones are surrounded by plural rings of speakers that generate calibration sounds that are recorded by the microphones and stored digitally on a personal computer or other smart device or cloud server or other storage. In some implementations the sound source material is generated by a particular sound system (2-channel or multi-channel) that exists outside the headphones. Internal (relative to the headphones) calibration signals may be used to aid the process as well.

As mentioned above, the calibration file can include an FIR filter or filters that can be implemented on a digital signal processor (DSP). The complexity or number of taps needed to accurately model the user's HRTF may be determined by the application using the calibration files to filter sound on the user's playback device. The user may also be given the opportunity to select the number of taps, within a given range.

Present principles may be extended to equipment, such as stereo playback on speakers, multi-channel playback, multi-channel playback created from stereo, or future equipment and setups.

This disclosure accordingly relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is an example of a device that may be configured to undertake present principles (e.g. communicate with other devices to undertake present principles, execute the logic described herein, and perform any other functions and/or operations described herein).

Figure 1:
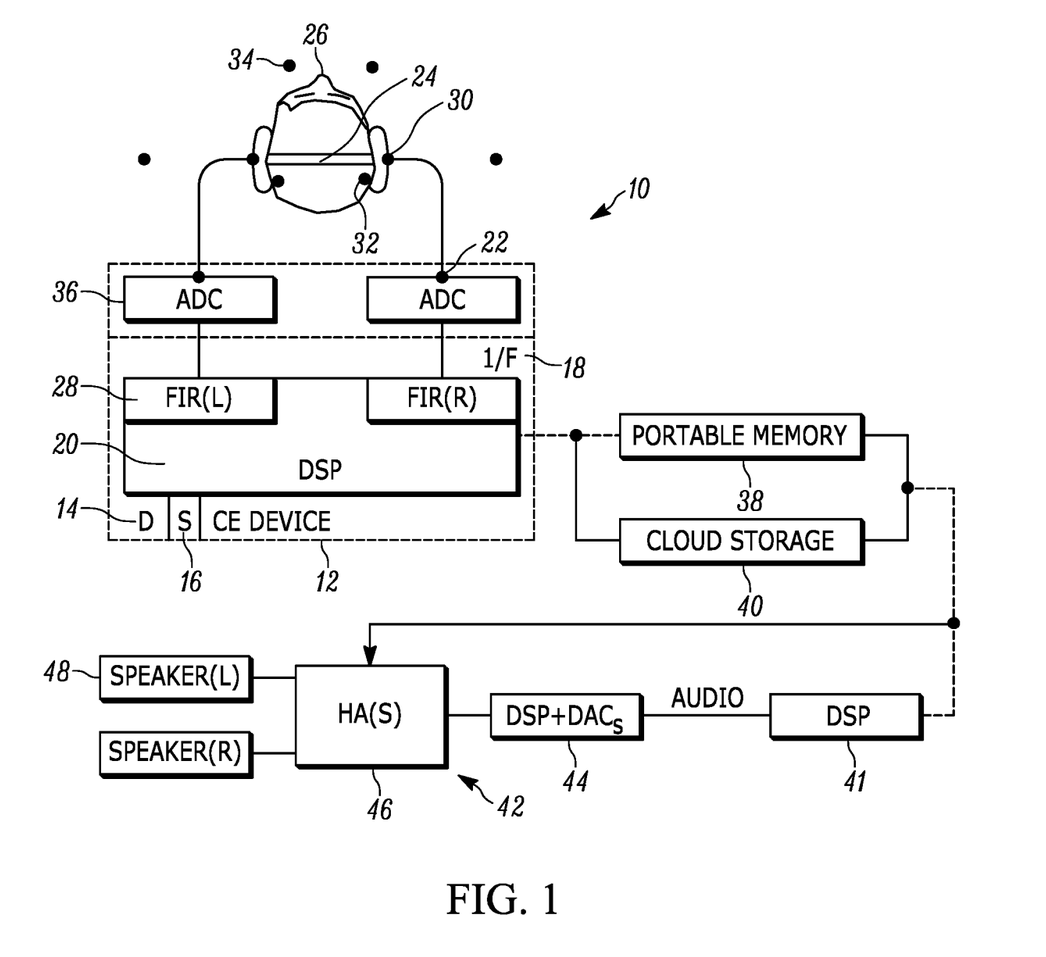
FIG. 1 is a block diagram of an example HRTF recording and playback system.

Accordingly, to undertake such principles the CE device 12 can be established by some or all of the components shown in FIG. 1. For example, the CE device 12 can include one or more touch-enabled displays 14, and one or more speakers 16 for outputting audio in accordance with present principles. The example CE device 12 may also include one or more network interfaces 18 for communication over at least one network such as the Internet, a WAN, a LAN, etc. under control of one or more processors 20 such as but not limited to a DSP. It is to be understood that the processor 20 controls the CE device 12 to undertake present principles, including the other elements of the CE device 12 described herein. Furthermore, note the network interface 18 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 22 such as, e.g., a USB port to physically connect (e.g. using a wired connection) to another CE device and/or a headphone 24 that can be worn by a person 26. The CE device 12 may further include one or more computer memories 28 such as disk-based or solid-state storage that are not transitory signals on which is stored files such as the below-described HRTF calibration files. The CE device 12 may receive, via the ports 22 or wireless links via the interface 18 signals from first microphones 30 in the earpiece of the headphones 24, second microphones 32 in the ears of the person 26, and third microphones 34 external to the headphones and person, although only the headphone microphones may be provided in some embodiments. The signals from the microphones 30, 32, 34 may be digitized by one or more analog to digital converters (ADC) 36, which may be implemented by the CE device 12 as shown or externally to the CE device.

As described further below, the signals from the microphones can be used to generate HRTF calibration files that are personalized to the person 26 wearing the calibration headphones. A HRTF calibration file typically includes at least one and more typically left ear and right ear FIR filters, each of which typically includes multiple taps, with each tap being associated with a respective coefficient. By convoluting an audio stream with a FIR filter, a modified audio stream is produced which is perceived by a listener to come not from, e.g., headphone speakers adjacent the ears of the listener but rather from relatively afar, as sound would come from an orchestra for example on a stage that the listener is in front of.

To enable end users to access their personalized HRTF files, the files, once generated, may be stored on a portable memory 38 and/or cloud storage 40 (typically separate devices from the CE device 12 in communication therewith, as indicated by the dashed line), with the person 26 being given the portable memory 38 or access to the cloud storage 40 so as to be able to load (as indicated by the dashed line) his personalized HRTF into a receiver such as a digital signal processor (DSP) 41 of playback device 42 of the end user. Or, an audio source such as but not limited to a web-based audio streaming server may access the user's HRTF and filter audio streams through the HRTFs prior to streamlining the (now personalized) audio streams to the user over a computer network.

A playback device may include one or more additional processors such as a second digital signal processor (DSP) with digital to analog converters (DACs) 44 that digitize audio streams such as stereo audio or multi-channel (greater than two track) audio, convoluting the audio with the HRTF information on the memory 38 or downloaded from cloud storage. This may occur in one or more headphone amplifiers 46 which output audio to at least two speakers 48, which may be speakers of the headphones 24 that were used to generate the HRTF files from the test tones. U.S. Pat. No. 8,503,682, owned by the present assignee and incorporated herein by reference, describes a method for convoluting HRTF onto audio signals. Note that the second DSP can implement the FIR filters that are originally established by the DSP 20 of the CE device 12, which may be the same DSP used for playback or a different DSP as shown in the example of FIG. 1. Note further that the playback device 42 may or may not be a CE device.

In some implementations, HRTF files may be generated by applying a finite element method (FEM), finite difference method (FDM), finite volume method, and/or another numerical method, using 3D models to set boundary conditions.

Figure 2:
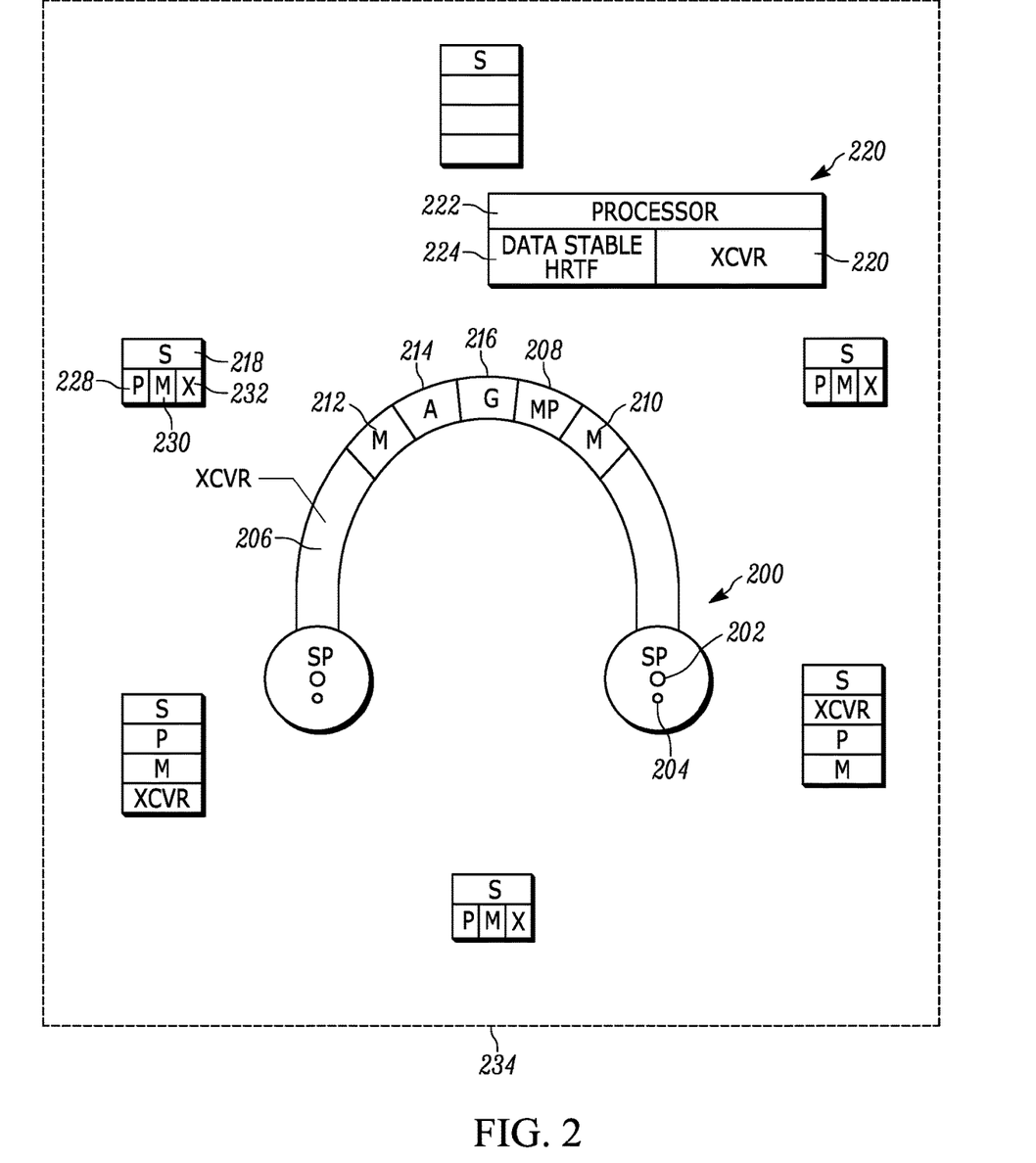
FIGS. 2 and 3 are block diagrams of example HRTF recording systems.
Figure 3:
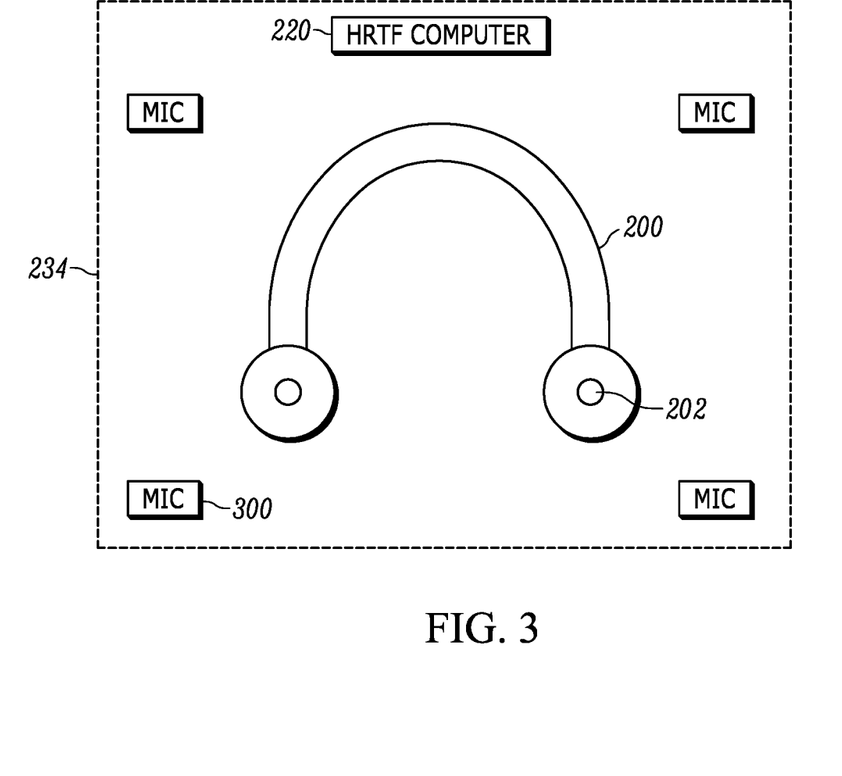

FIGS. 2 and 3 show respective HRTF file generation systems using only a single "sphere" of speakers (FIG. 2) or microphones (FIG. 3) for simplicity, it being understood that the principles of FIGS. 2 and 3 may be extended to multiple spheres according to disclosure further below. Alternatively, only a single sphere of speakers (or microphones if FIG. 3 is used) may be provided as illustrated in FIG. 2, with the speakers being movable toward and away from the center of the sphere to render the multiple sphere HRTFs described more fully below.

In FIG. 2, a person (not shown) may wear headphones 200 with left and right earphone speakers 202. In lieu of or adjacent to each speaker 202 may be a respective microphone 204 for playing HRTF calibration test tones.

In the example shown, the headphones 200 may include one or more wireless transceivers 206 communicating with one or more processors 208 accessing one or more computer storage media 210. The headphones 200 may also include one or more motions sensors communicating with the processor. In the example shown, the headphones 200 include at least one magnetometer 212, at least one accelerometer 214, and at least one gyroscope 216 to establish a nine-axis motion sensor that generates signals representing orientation of the head of the wearer of the headphones 200. U.S. Pat. Nos. 9,448,405 and 9,740,305, owned by the present assignee and incorporated herein by reference, describes a nine-axis orientation measuring system in a head-mounted apparatus.

While all nine axes may be used to determine a head orientation for purposes to be shortly disclosed, in some embodiments, recognizing that sound varies the most as a person moves his head in the horizontal plane, motion in the vertical dimension (and concomitant sensor therefor) may be eliminated for simplicity.

In the example of FIG. 2, test tones from one or more speakers 218 may be played and picked up by the microphones 204, and signals from the microphones 204 may be sent via the transceiver 206 or through a wired connection to a HRTF generation computer 220, which typically includes a processor 222, computer storage 224, and communication interface 226, as well as other appropriate computers such as any described herein. Also, each speaker 218 may include a speaker processor 228 accessing speaker computer storage 230 and communicating via wired or wireless links with the computer 220 via a communication interface 232. In the example shown, test tones or other test sounds are generated by plural speakers surrounding the headphones 200 within a space 234. The space 234 may be a room of the end user's dwelling, with HRTF files being generated for each room and then the HRTF file corresponding to a room in which the end user wishes to listen to audio being selected. Or, the space 234 may be an anechoic-coated or other special sound recording room. Yet again, to generate the venue-specific HRTF described below that is independent of a person and later concatenated with a person's HRTF, the space 234 may be the venue itself, e.g., Carnegie Hall, Sadler's Wells, Old Vic, the Bolshoi theater, etc. U.S. Pat. No. 8,787,584, owned by the present assignee and incorporated herein by reference, describes a method for establishing HRTF files to account for the size of a human head. U.S. Pat. No. 8,520, 857, owned by the present assignee and incorporated herein by reference, describes a method for determining HRTF. This patent also describes measuring a HRTF of a space with no dummy head or human head being accounted for.

In FIG. 2, the end user wearing the headphones 200 may be asked to orient his head at a first orientation, with coefficients of a first FIR filter being determined at that orientation, and then may be asked to reorient his head at a second orientation, with coefficients of a second filter being determined at that second orientation, and so on for plural orientations. The filters together establish the HRTF file. Or, the user may be instructed to remain motionless and the speakers 218 moved to generate the first, second . . . $N^{th}$ filters. If desired, the techniques described in U.S. Pat. No. 9,118,991, owned by the present assignee and incorporated herein by reference, may be used to reduce the file size of HRTF files.

FIG. 3 illustrates an embodiment that in all essential respects is identical to that of FIG. 2, except that instead of test audio being played on external speakers and picked up on microphones in the headphones 200, test audio is played on the speakers 202 of the headphones 200 and picked up by one or more microphones 300 that are external to the headphones 200 and in communication with the HRTF computer 220. It is to be understood that principles discussed further below in terms of speaker spheres apply equally to use of plural microphone spheres when the obverse system of FIG. 3 (compared to FIG. 2) is used. Additional details pertaining to obtaining HRTFs for multiple head orientations are set forth in U.S. Pat. No. 10,003, 905, owned by the present assignee and incorporated herein by reference.

Figure 4:
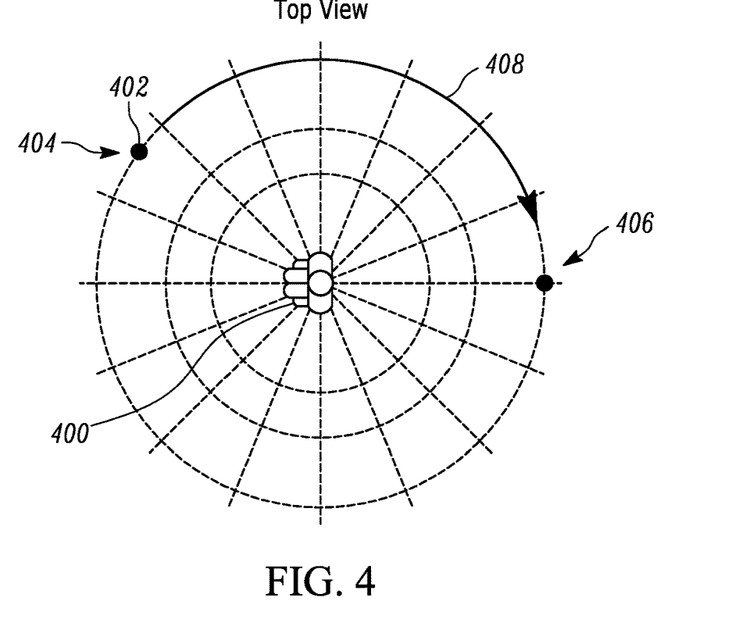
FIGS. 4 and 5 are schematic diagrams illustrating the improved robustness of using multiple HRTF calibration spheres to enable locating virtual objects at multiple perceived distances from a listener (FIG. 5) compared to using only a single sphere (FIG. 4)
Figure 5:
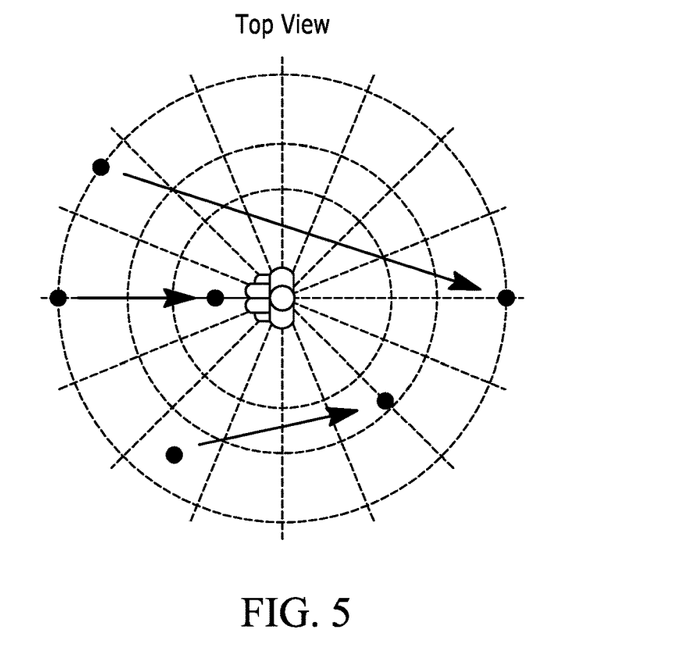

FIGS. 4 and 5 illustrate the enhanced robustness provided by present principles in placing audio objects in emulated space as perceived by a listener 400. In FIG. 4, absent present principles, when the demanded location in emulated space of an audio object 402 moves from an origin 404 to a destination 406 as indicated by the arc 408, its perceived bearing from the listener 400 changes according to demanded bearing information in metadata accompanying the audio object in a data structure colloquially referred to as a "sidecar", but its perceived distance from the listener is constrained to be constant, essentially at the outer edge or surface of the sphere defined by the speakers during calibration.

In contrast, as shown in FIG. 5, when multiple HRTFs are derived using multiple speaker spheres, the HRTF of the sphere closest to the demanded distance (interpolated if desired for demanded distances between sphere radii as discussed further below) is used to render the audio object, meaning that the system is more robust in rendering audio objects not only at demanded bearings from the listener but also at demanded distances from the listener.

Figure 6:
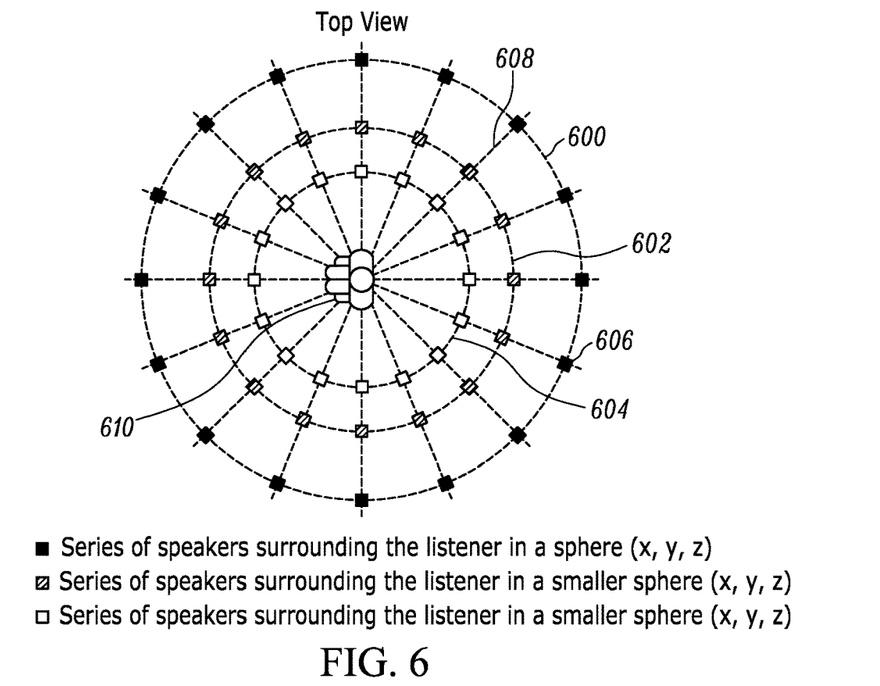
FIG. 6 is a schematic top view of a first multi-ring or multi-sphere HRTF calibration speaker arrangement consistent with present principles.

FIG. 6 illustrates a first arrangement of calibration speakers showing for simplicity three rings 600, 602, 604 (from outer most to inner most) or spheres of speakers 606. The arrangement of FIG. 6 may be realized using three separate sets of speakers as shown, or only a single set of speakers arranged in the first ring or sphere 600 to calibrate a first set of HRTFs, then moved to the location of the second ring or sphere 602 to calibrate a second set of HRTFs, and so on in sequence.

In the example shown in FIG. 6, the speakers 606 of the rings or spheres 600-604 are aligned with each other along respective radials 608 extended from the center at which a listener 610 is located during portions of the calibration procedure. In contrast, in the example shown in FIG. 7, the speakers of the rings or spheres 600-604 are not all aligned with each other along respective radials 608. Instead, the speakers may all be offset, i.e., on different radials, or as shown in FIG. 7 may be staggered radially such that the speakers in the first and third rings or spheres 600, 604 are aligned on common radials but the speakers in the second ring or sphere 602 are radially offset from the speakers in the first and third rings or spheres.

Figure 7:
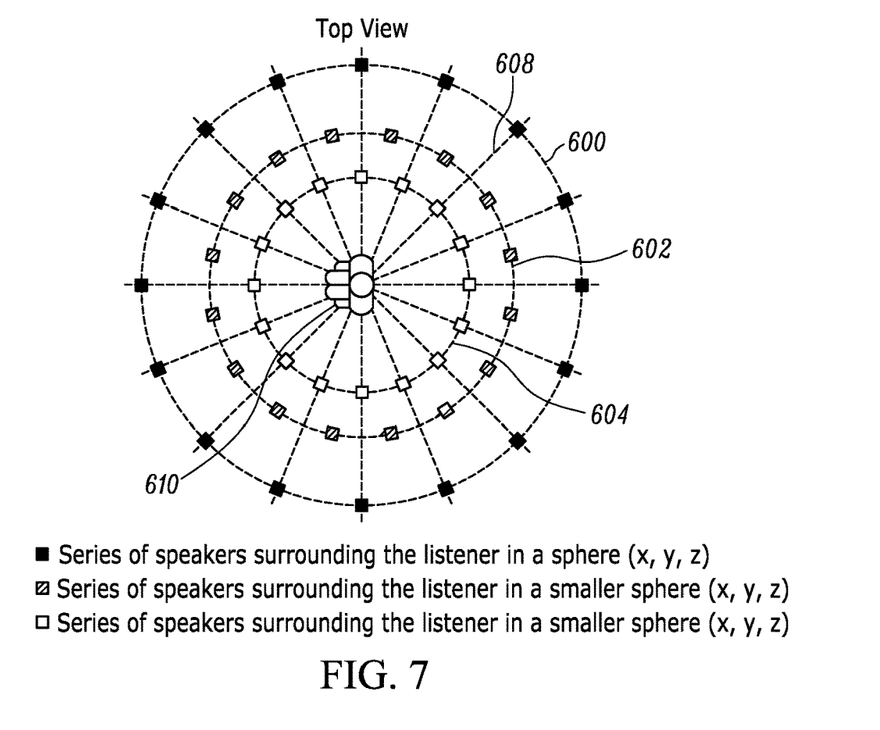
FIG. 7 is a schematic top view of a second multi-ring or multi-sphere HRTF calibration speaker arrangement consistent with present principles.
Figure 8:
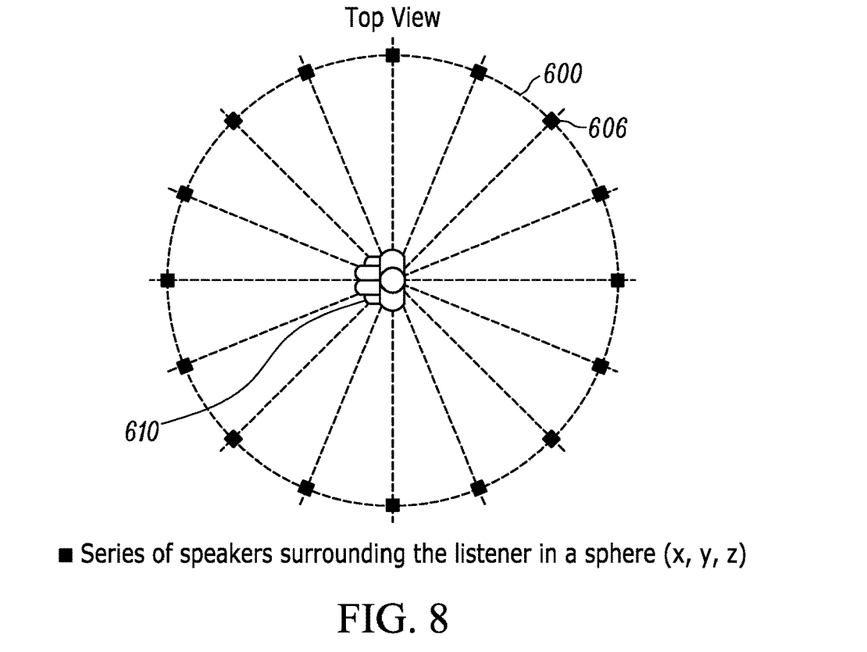
FIGS. 8 and 9 are, respectively, schematic top and side views of a single ring or sphere in a multi-ring or multi-sphere HRTF calibration speaker arrangement consistent with present principles to illustrate the three-dimensional aspects of some embodiments.
Figure 9:
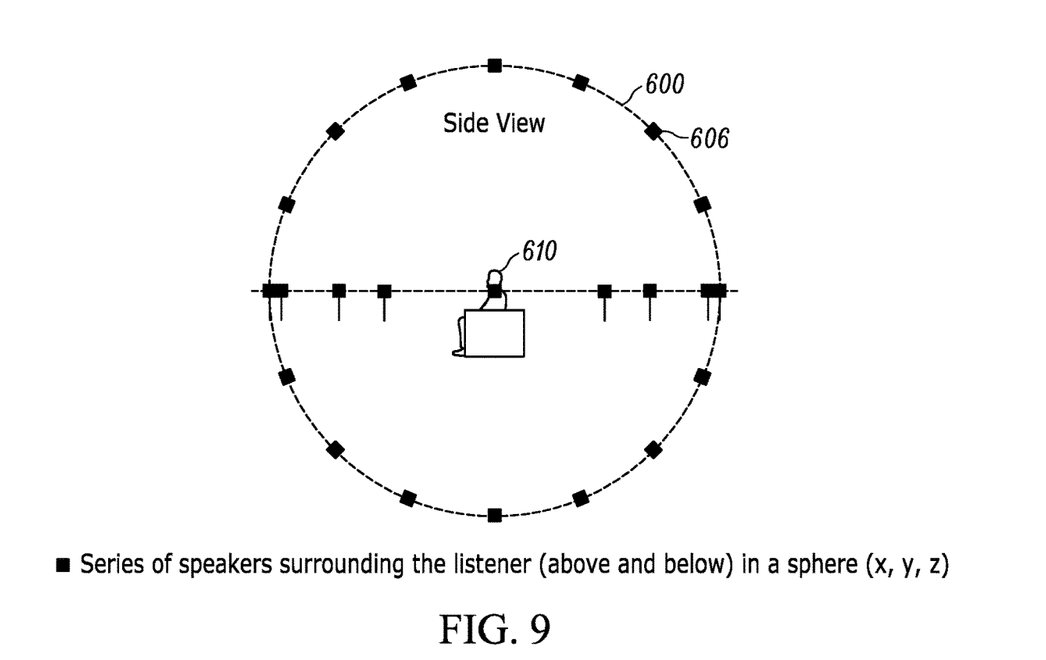

It is to be further understood while the phrase "rings or spheres" is used, two-dimensional figures such as those illustrated in FIGS. 6 and 7, although showing rings of speakers, may represent spheres of speakers in three dimensions (x, y, z) as indicated in the legends accompanying FIGS. 6 and 7. Indeed, this is reflected in FIGS. 8 and 9, which show a top view and side view, respectively, of a single sphere of speakers, in the example shown, the outermost sphere 600 illustrated in FIGS. 6 and 7. Note that the more spheres that are used, the better the audio object location. In a preferred implementation the speaker sphere can be incrementally stepped inward for each sphere HRTF.

Figure 10:
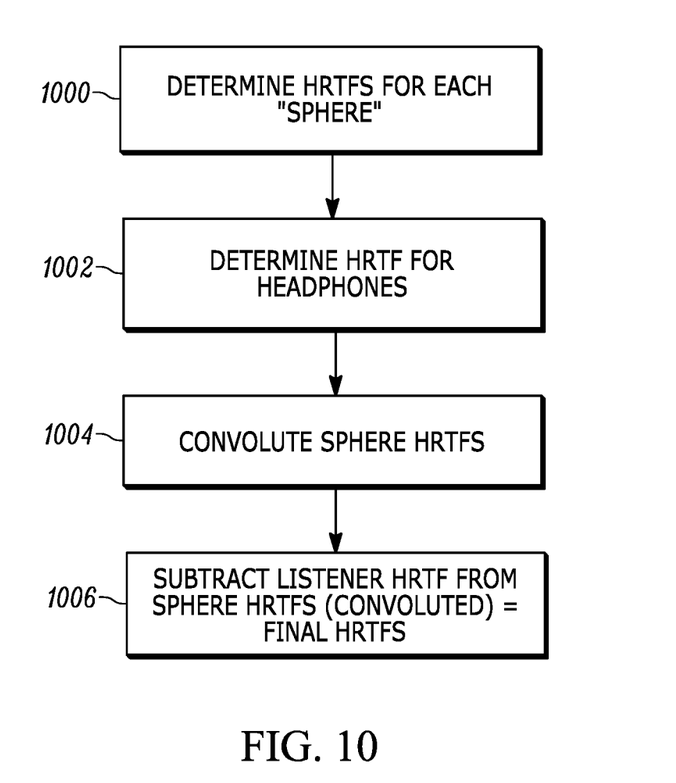
FIG. 10 is a flow chart of example HRTF calibration logic consistent with present principles.

Now referring to FIG. 10 for an understanding of an example HRTF calibration technique, commencing at block 1000 HRTFs are determined for each ring or sphere of speakers. This may be done, e.g., by placing a microphone in listener-worn headphones at the center of the concentric spheres and then causing each individual speaker in the sphere to emit a test tone or a sweep of tones recorded on a laptop, which is detected by the microphone and with the ensuing signal detected by the microphone being processed as a data point for establishing filter coefficients for "sphere" HRTFs. Or, all speakers in a single ring or sphere may be actuated at once, with the microphone output being recorded. It is to be understood that when the obverse concept of FIG. 3 is used (central speaker, rings or spheres of microphones), the signals from each microphone one at a time are recorded for use in HRTF calibration. In any case, it is preferred that the listener with the headphones not move his head during this process.

Once all sphere HRTFs are recorded, the process moves to block 1002 to determine a headphone HRTF. To do this, the listener remains in the same position and location and one or more microphones remain in the headphones (or elsewhere in the listener's ear). Then, one or more speakers/speaker drivers within the headphones are actuated to emit test tone(s) that are detected by the microphone(s) and recorded as the headphone HRTF. It will be appreciated that it may be more convenient to determine the sphere HRTF first and the headphone HRTF second.

In some embodiments, the logic moves to block 1004 to convolute the "sphere" HRTFs together. At block 1006 the "headphone" HRTF is subtracted from the (convoluted) sphere HRTFs to render a set of final HRTFs, which are associated with the respective distances from the center (or listener) of each sphere of speakers. Thus, final HRTFs may be established by the above calibration process for each speaker, each sphere, or for all spheres, and if desired for each of the left ear and right ear.

Figure 11:
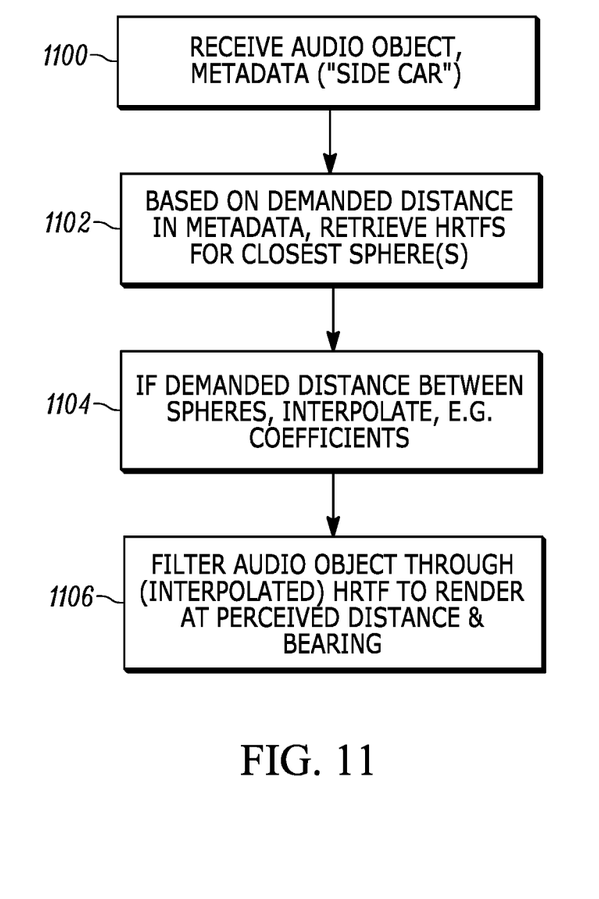
FIG. 11 is a flow chart of example audio object rendering logic consistent with present principles.

FIG. 11 illustrates how audio objects may be rendered using the HRTFs calibrated as described in FIG. 10. At block 1100 an audio object is received from an audio source. The audio object typically is accompanied by metadata in a so-called "sidecar" data structure that may indicate a demanded bearing and distance from a listener in emulated space.

Proceeding to block 1102, based on the demanded distance and if desired bearing, the appropriate HRTF associated most closely with the demanded distance (and if desired bearing) is retrieved. If the demanded distance is between two spheres, at block 1104 an interpolation may be effected between the relevant coefficients of the spheres. The interpolation may be linear or non-linear. As an example, if the demanded distance is three units of distance from the immediately inner sphere and six units of distance from the immediately outer sphere (i.e., is twice as close to the inner sphere as the outer sphere), an interpolated coefficient may be determined as:

$C_{interpolated} = (2*C_{inner} + C_{outer})/2$, where $C_{inner}$ is the coefficient of the HRTF associated with the inner sphere and $C_{outer}$ is the coefficient of the HRTF associated with the outer sphere.

Moving to block 1106, the audio object is filtered through the HRTF from block 1102 (or the interpolated HRTF from block 1104), for each of the left and right headphone speakers if desired, and rendered on headphones or other speakers to emulate being located at the demanded distance and bearing from the listener.

Figure 12:
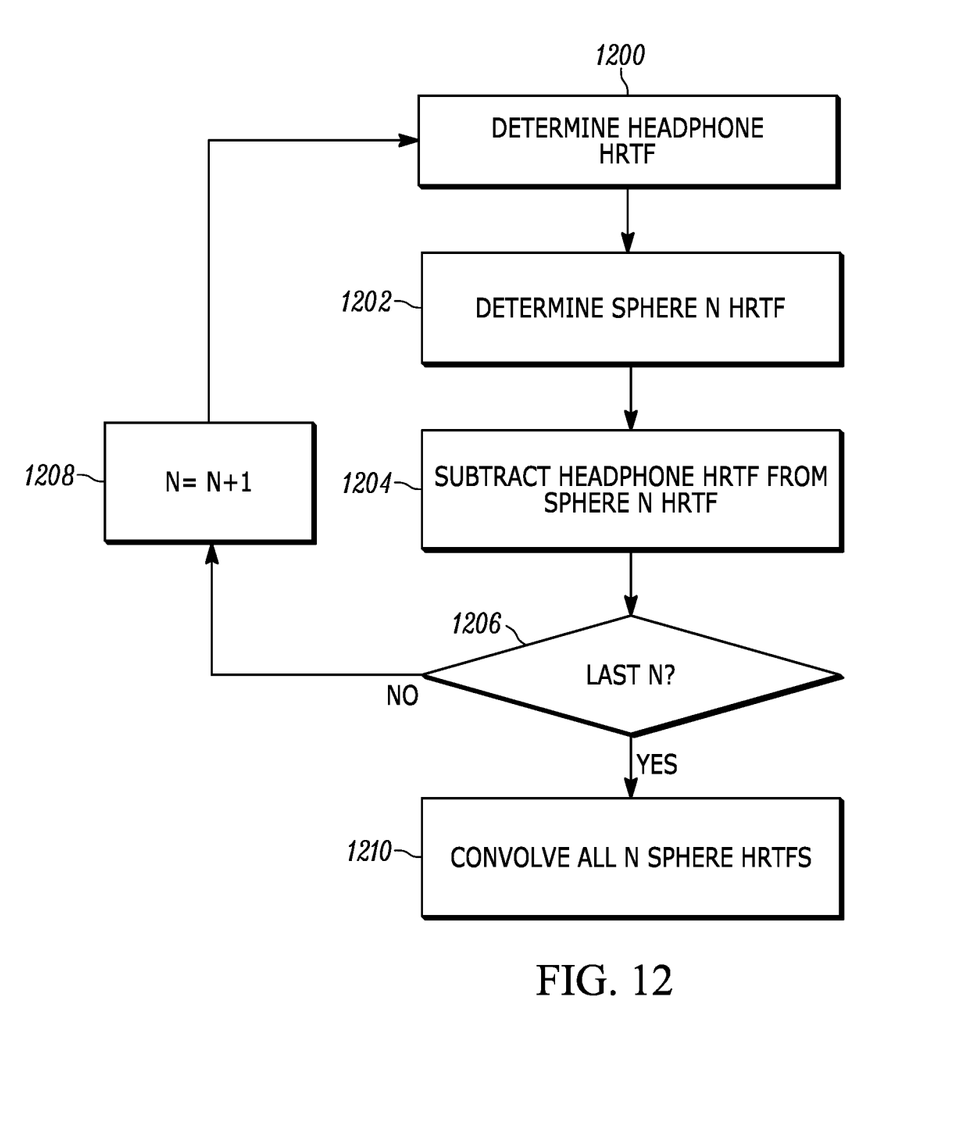
FIG. 12 is a flow chart of alternate example HRTF calibration logic consistent with present principles.

FIG. 12 illustrates an alternate technique to determine sphere HRTFs. Commencing at block 1200, a headphone HRTF is determined. In the first iteration in which "N" spheres are used, N=1. Moving to block 1202, the HRTF for the sphere under test is determined. Note that the steps of blocks 1200 and 1202 may be reversed, i.e., the sphere HRTF may be determined and then the headphone HRTF, in which case logic below loops back to "first" block 1202 to flow from there to "second" block 1200.

At block 1204 the headphone HRTF is subtracted from the sphere HRTF. State 1206 indicates that it is determined conceptually whether all spheres have had HRTFs determined using the speakers in those spheres, and if not, block 1208 indicates conceptually setting N=N+1 and then looping back to block 1200 to determine the headphone HRTF and HRTF for the next sphere.

When state 1206 indicates that all spheres are tested for, the logic combines, e.g., convolves, the N sphere HRTFs together at block 1210. In some embodiments this may be executed by convolving the first sphere HRTF, subtracting out the first headphone HRTF, convolving the second sphere HRTF, subtracting out the second headphone HRTF, etc. until all "N" sphere and headphone HRTFs have been processed.

It may now be appreciated that the sphere HRTF considers the entire room acoustics and the speakers all the way into the ear, where the microphones are placed. The headphone HRTF considers only how the listener hears with headphones. Typically, music played back on headphones is always heard within the head, due to the fact that there are no room acoustic cues. After the HRTF math is done and music played back on a headphone setup, the listener will now hear the music as if it is coming from speakers within the room, but not hear the music "inside the head."

The above techniques for enabling listening to music or other audio in headphones that sound outside of the head has applications in the medical industry, virtual reality, computer gaming, as well as consumer electronics.

While the particular embodiments are herein shown and described in detail, it is to be understood that the subject matter which is encompassed by the present invention is limited only by the claims.

What is claimed is:

1. A system comprising:
at least one processor configured with instructions to:
access at least first and second sets of head related transfer functions (HRTF) associated with respective first and second distances from a location, the first distance being shorter than the second distance;
identify a demanded distance of at least one audio object;
select at least a first HRTF from the first set of HRTFs based at least in part on the demanded distance being closer to the first distance than to the second distance;
subtract from the first HRTF a headphone HRTF derived using at least one speaker in a headphone and at least one microphone in the headphone to render a modified first HRTF, the headphone HRTF related to acoustics of the headphone itself; and
process the audio object using the modified first HRTF to render the audio object;
detect sound emitted by the at least one speaker using plural microphones in a first set of microphones located at a first radial distance from the at least one speaker;
use signals from the plural microphones in the first set of microphones to establish the first set of HRTF s;
detect sound emitted by the at least one speaker using plural microphones in a second set of microphones located at a second radial distance from the at least one speaker; and
use signals from the plural microphones in the second set of microphones to establish the second set of HRTFs.

2. The system of claim 1, wherein the first set of HRTF is associated with a first sphere having a radius of the first distance and the second set of HRTF is associated with a second sphere having a radius of the second distance.

3. The system of claim 2, comprising a third set of HRTF associated with a third sphere having a radius equal to a third distance shorter than the first distance, and the instructions are executable to:
responsive to identifying the demanded distance being between the first and third distances, process the audio object using an interpolation of at least the first HRTF and at least one HRTF from the third set of HRTF.

4. The system of claim 1, wherein the instructions are executable to:
select at least the first HRTF from the first set of HRTF based at least in part on a demanded bearing of the audio object.

5. The system of claim 1, wherein the first HRTF and the headphone HRTF are both established based on input from one or more microphones.

6. The system of claim 1, wherein the at least one processor is configured with instructions to:
use input from at least one microphone to measure the acoustics of the headphone itself.

7. The system of claim 1, wherein the processor is configured with instructions to:
with the head of a wearer in a first orientation and HRTF measurement components at a first radial distance from the wearer, establish the first set of HRTFs; and
with the head of a wearer in the first orientation and HRTF measurement components at a second radial distance from the wearer, establish the second set of HRTF.

8. A method, comprising:
establishing plural sets of head related transfer functions (HRTF) associated with respective plural radial distances from a headphones and outside the headphones;
providing the plural sets of HRTF at least one of which is modified by a headphone HRTF derived using at least one speaker in the headphones and at least one microphone in the headphones to render audio objects, the headphone HRTF related to how a user hears with the headphones themselves;
wherein the establishing comprises:
energizing at least one speaker at the origin;
detecting sound emitted by the speaker using plural microphones in a first set of microphones located at the first radial distance from the at least one speaker;
using signals from the microphones in the first set of microphones located at the first radial distance to establish a first of the sets of HRTF;
moving the first set of microphones to the second radial distance;
detecting sound emitted by the first set of microphones located at the second radial distance from the at least one speaker; and
using signals from the first set of microphones located at the second radial distance to establish a second of the sets of HRTF.

9. The method of claim 8, wherein the establishing comprises:
energizing speakers in a first set of speakers located at the first radial distance from at least one microphone;
using signals from the microphone generated in response to energizing the speakers in the first set of speakers to establish a first of the sets of HRTF;
energizing speakers in a second set of speakers located at the second radial distance from the microphone; and
using signals from the microphone generated in response to energizing the speakers in the second set of speakers to establish a second of the sets of HRTF.

10. The method of claim 9, wherein speakers in the first set of speakers are not radially aligned with respective speakers in the second set of speakers.

11. The method of claim 9, wherein speakers in the first set of speakers are arranged in a sphere.

12. The method of claim 8, wherein the establishing comprises:
energizing speakers in a first set of speakers located at the first radial distance from at least one microphone;
using signals from the microphone generated in response to energizing the speakers in the first set of speakers at the first radial distance to establish a first of the sets of HRTF;
moving the speakers in the first set of speakers to a second radial distance from the microphone;
energizing the speakers in the first set of speakers located at the second radial distance from the microphone; and
using signals from the microphone generated in response to energizing the speakers at the second radial distance to establish a second of the sets of HRTF.

13. The method of claim 8, wherein the establishing comprises:
energizing at least one speaker at the origin;
detecting sound emitted by the speaker using plural microphones in a first set of microphones located at the first radial distance from the at least one speaker;
using signals from the microphones in the first set of microphones to establish a first of the sets of HRTF;
detecting sound emitted by the speaker using plural microphones in a second set of microphones located at the second radial distance from the at least one speaker; and
using signals from the microphones in the second set of microphones to establish a second of the sets of HRTF.

14. The method of claim 8, comprising:
prompting a wearer of the headphones to orient his head at a first orientation, with coefficients of a first FIR filter being determined at the first orientation, and then prompting the wearer to reorient his head at a second orientation, with coefficients of a second filter being determined at the second orientation.

15. A method, comprising:
establishing plural sets of head related transfer functions (HRTF) associated with respective plural radial distances from a headphones and outside the headphones;
providing the plural sets of HRTF at least one of which is modified by a headphone HRTF derived using at least one speaker in the headphones and at least one microphone in the headphones to render audio objects, the headphone HRTF related to how a user hears with the headphones themselves;
with the head of a wearer in a first orientation and HRTF measurement components at a first radial distance from the wearer, establishing a first set of HRTF;
moving the HRTF measurement components to a second radial distance from the wearer; and
with the head of a wearer in the first orientation and HRTF measurement components at the second radial distance from the wearer, establishing a second set of HRTF.

* * * * *